United States Patent
Taga

(10) Patent No.: US 10,134,541 B2
(45) Date of Patent: Nov. 20, 2018

(54) KEYBOARD

(71) Applicant: FUJITSU COMPONENT LIMITED, Tokyo (JP)

(72) Inventor: Daisuke Taga, Tokyo (JP)

(73) Assignee: FUJITSU COMPONENET LIMITED, Tokyo (JP)

( * ) Notice: Subject to any disclaimer, the term of this patent is extended or adjusted under 35 U.S.C. 154(b) by 6 days.

(21) Appl. No.: 15/619,854

(22) Filed: Jun. 12, 2017

(65) Prior Publication Data

US 2018/0012713 A1    Jan. 11, 2018

(30) Foreign Application Priority Data

Jul. 5, 2016 (JP) ................................ 2016-133767

(51) Int. Cl.
  *H01H 3/12* (2006.01)
  *H01H 13/70* (2006.01)
  *H01H 13/14* (2006.01)

(52) U.S. Cl.
  CPC ............ *H01H 13/14* (2013.01); *H01H 3/122* (2013.01); *H01H 13/70* (2013.01); *H01H 2221/058* (2013.01); *H01H 2221/078* (2013.01); *H01H 2237/008* (2013.01)

(58) Field of Classification Search
  CPC .. H01H 2221/078; H01H 13/14; H01H 13/70; H01H 3/122; H01H 2237/008; H01H 2221/058
  See application file for complete search history.

(56) References Cited

U.S. PATENT DOCUMENTS

| 4,553,009 | A | * | 11/1985 | Van Zeeland | .......... H01H 13/20 200/342 |
| 4,771,146 | A | * | 9/1988 | Suzuki | .................. H01H 3/122 200/344 |
| 5,204,511 | A | * | 4/1993 | Baitz | .................... H01H 13/705 200/5 A |
| 7,842,895 | B2 | * | 11/2010 | Lee | ...................... H01H 13/705 200/314 |
| 2014/0102868 | A1 | | 4/2014 | Nakajima et al. | |

FOREIGN PATENT DOCUMENTS

JP     2014-82099     5/2014

OTHER PUBLICATIONS

Japanese Platform for Patent Information, Publication No. 2014-82099, dated May 8, 2014.

* cited by examiner

*Primary Examiner* — Felix O Figueroa
(74) *Attorney, Agent, or Firm* — Staas & Halsey LLP

(57) ABSTRACT

A keyboard including: a key top; a slide member that is attached to the key top, slides up and down, and presses a contact via an elastic member; a non-slide member that is attached to the key top, and never moves up and down; supporters that support the slide member and the non-slide member, respectively; wherein the slide member is restrained by the key top in a first direction, and is movable in a second direction vertical to the first direction, and the non-slide member is arranged diagonally with the slide member, is movable in the first direction, and is restrained by the key top in the second direction.

7 Claims, 8 Drawing Sheets

KEYBOARD

CROSS-REFERENCE TO RELATED APPLICATION

This application is based upon and claims the benefit of priority of the prior Japanese Patent Application No. 2016-133767 filed on Jul. 5, 2016, the entire contents of which are incorporated herein by reference.

FIELD

A certain aspect of the embodiments is related to a keyboard.

BACKGROUND

Conventionally, there has been known a keyboard that can change a layout and a size of a key top (see Japanese Laid-open Patent Publication No. 2014-82099). In this keyboard, when two single-size key tops are replaced with a double-size key top, one slider among two sliders fixed to the double-size key top depresses a contact for key input, and another slider does not depress the contact for key input. By this configuration, the increase of an operation load by the enlargement of the size of the key top is restrained.

SUMMARY

According to an aspect of the present invention, there is provided a keyboard including: a key top; a slide member that is attached to the key top, slides up and down, and presses a contact via an elastic member; a non-slide member that is attached to the key top, and never moves up and down; supporters that support the slide member and the non-slide member, respectively; wherein the slide member is restrained by the key top in a first direction, and is movable in a second direction vertical to the first direction, and the non-slide member is arranged diagonally with the slide member, is movable in the first direction, and is restrained by the key top in the second direction.

The objects and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the size of the key top enlarges like a quadruple-size key top or a nonuple-size key top, rattle in a vertical direction at a corner part of the key top might become large. In such a condition, when the corner part of the key top is depressed, the contact for key input is not ON, i.e., a condition that the key input is not carried out might occur.

A description will now be given of an embodiment according to the present invention with reference to drawings. In the present embodiment, a keyboard adopted in a POS (Point of Sales) system is illustrated and explained.

Figure 1A:
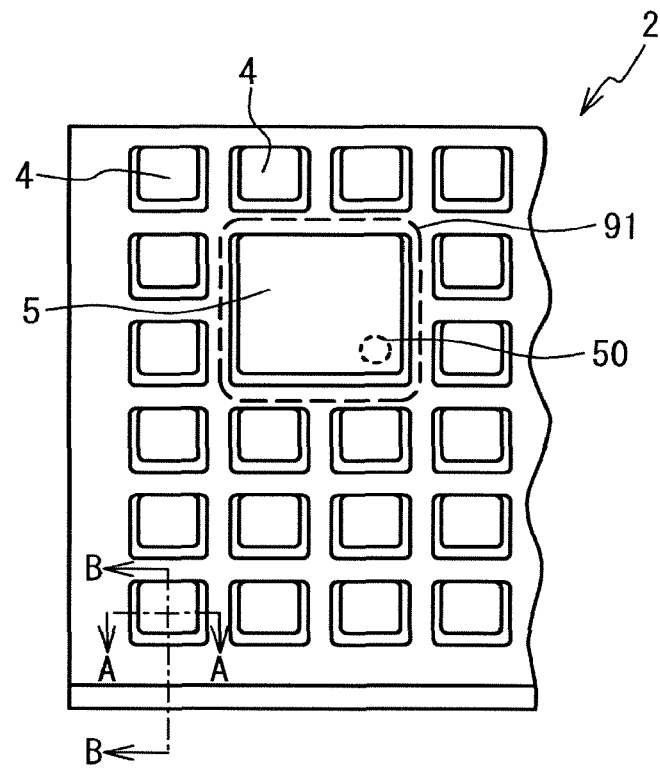
FIG. 1A is a schematic perspective view explaining a first condition of a keyboard according to an embodiment.

FIG. 1A is a schematic perspective view explaining a first condition of the keyboard according to an embodiment. In a keyboard 2 according to this embodiment, a plurality of key switch devices are arranged. Each key switch device includes: a moving member that moves by the key top being depressed; and a unit part that supports the moving member, and includes a contact in which electrodes are connected by the movement of the moving member. Here, the moving member and the unit part are mentioned later in detail.

In the first condition, key tops 4 and a key top 5 in which surface shapes are different from each other are arranged. Each key top 4 is a single-size key top corresponding to a single unit part. The key top 5 corresponds to a plurality of unit parts (specifically, four unit parts), and is the quadruple-size key top having a pressing surface that is an area of approximately four times of the key top 4. In a domain 91, the quadruple-size key top 5 is arranged. Moreover, a connection unit part 50 is the unit part in which the electrodes of the contact are connected to each other when the key top 5 is pressed, among the plurality of unit parts, as described later.

Figure 1B:
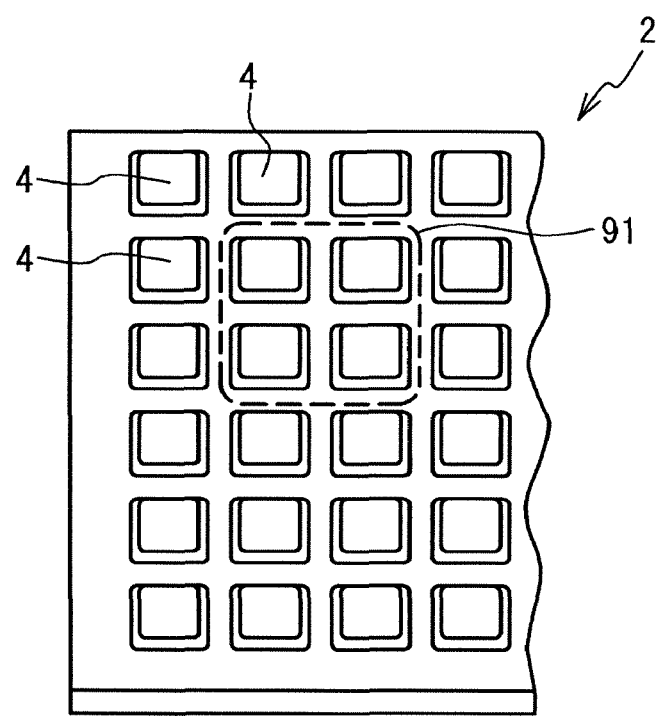
FIG. 1B is a schematic perspective view explaining a second condition of the keyboard according to an embodiment.

FIG. 1B is a schematic perspective view explaining a second condition of the keyboard according to the present embodiment. In the second condition, the single-size key top 4 is arranged for each unit part. The keyboard 2 in the present embodiment is formed so that the size of the key top can be changed as illustrated in FIGS. 1A and 1B. For example, four key tops 4 are removed as illustrated in the domain 91 of FIG. 1B, and the single key top 5 illustrated in FIG. 1A can be attached.

Figure 2A:
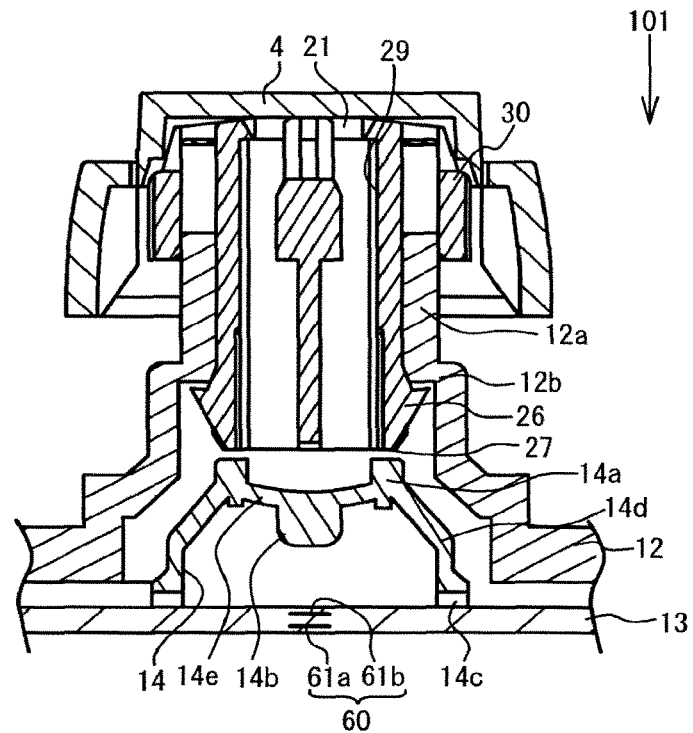
FIG. 2A is a cross-section diagram taken along line A-A of FIG. 1A.
Figure 2B:
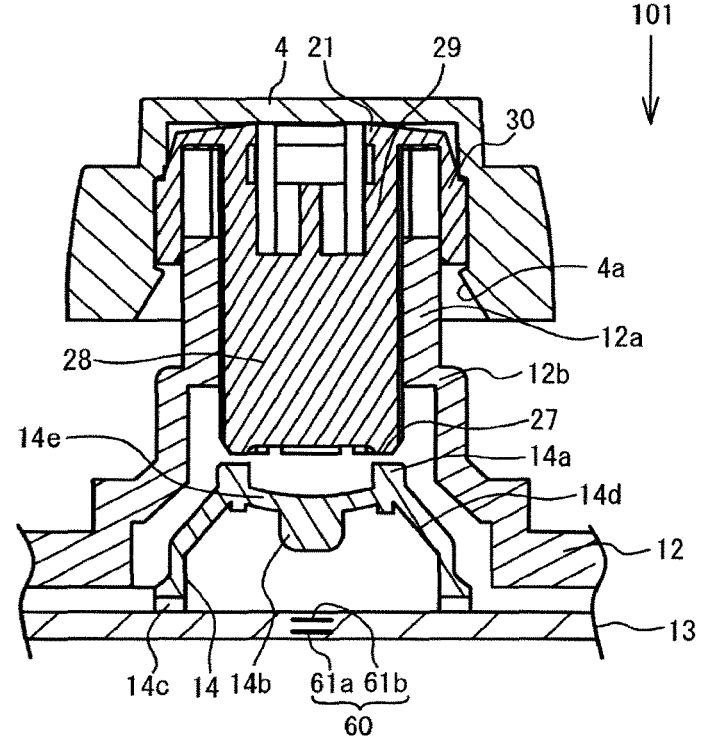
FIG. 2B is a cross-section diagram taken along line B-B of FIG. 1B.

FIG. 2A is a cross-section diagram taken along line A-A of FIG. 1A. FIG. 2B is a cross-section diagram taken along line B-B of FIG. 1B.

In the key switch device of FIGS. 2A and 2B, the single-size key top 4 is arranged. The key switch device of FIGS. 2A and 2B includes the key top 4 formed in a cap shape, a slider 21 as the moving member, a substrate 12 which includes supporters 12a supporting the slider 21, a membrane sheet 13, and a rubber cup 14. Each supporter 12a is a square as seen from above, and is formed in a tubular shape. Intervals between the supporters 12a adjacent to each other are all the same.

In the present embodiment, a portion including a contact 60 included in the membrane sheet 13, the rubber cup 14 and the supporter 12a is referred to as the unit part. The single unit part supports the single slider 21. The keyboard 2 in the present embodiment includes the plurality of unit parts. In the key switch device of FIGS. 2A and 2B, the slider 21 is arranged on the single unit part.

The key top 4 is supported by the slider 21. The slider 21 engages with the single supporter 12a, and presses the rubber cup 14. The key top 4 is fixed to the slider 21 by a claw part 4a. The key top 4 and the slider 21 are integrally removed from and integrally attached to the substrate 12.

The slider 21 slides up and down against the supporter 12a. The slider 21 includes: an inner wall part 29 that slides against an inner surface of the supporter 12a; and an outer wall part 30 that slides against an inner surface of the supporter 12a. The inner wall part 29 is inserted into the inside of the supporter 12a. That is, the supporter 12a is nipped between the inner wall part 29 and the outer wall part 30.

The inner wall part 29 of the slider 21 includes a locking pawl 26 that locks the slider 21 to the substrate 12. The locking pawl 26 locks to a locking part 12b formed on the substrate 12. The locking pawl 26 is hooked to the locking part 12b, which prevents the slider 21 from being removed from the substrate 12. Moreover, a pressing part 27 for pressing the rubber cup 14 is formed on a front edge of the inner wall part 29.

The membrane sheet 13 as an electric connection member is arranged under the substrate 12. The membrane sheet 13 includes the contact 60 therein. The contact 60 includes a lower electrode 61a and an upper electrode 61b. When the membrane sheet 13 is pressed, the lower electrode 61a and the upper electrode 61b which are opposite to each other are in contact with and electrically connected to each other. In FIGS. 2A and 2B, the membrane sheet 13 is single-layered structure, but may be laminated structure. For example, the membrane sheet 13 may include a upper layer, a lower layer and a spacer forming a gap between the upper layer and the lower layer.

The rubber cup 14 is an elastic member arranged between the membrane sheet 13 and the slider 21. The rubber cup 14 has elasticity, and energizes the slider 21 in a direction separated from the membrane sheet 13.

The rubber cup 14 includes a contact part 14a that contacts the pressing part 27 of the slider 21. The contact part 14a is formed in a tubular shape. The contact part 14a of the rubber cup 14 is pressed by the pressing part 27 of the slider 21. The rubber cup 14 includes a deformation part 14d. When the contact part 14a is pressed, the deformation part 14d is deformed and supplies a reaction force to the slider 21. When the contact part 14a is pressed, the deformation part 14d performs buckling deformation. When the pressure is released, the deformation part 14d returns to an original shape. The rubber cup 14 includes a recess part 14c through which an air flows when the rubber cup 14 is deformed. The recess part 14c is formed in a lower end of the rubber cup 14 so as to dent from a contact surface with the membrane sheet 13.

A pressing part 14b that projects downward and presses a domain where the contact 60 of the membrane sheet 13 is arranged is formed on the back side of an upper surface 14e of the rubber cup 14. Moreover, a plate part 28 that presses the pressing part 14b is formed on the slider 21.

In the key switch device of FIGS. 2A and 2B, when the key top 4 is depressed by a user, the key top 4 and the slider 21 move toward the substrate 12 as illustrated by an arrow 101. At this time, since the inner wall part 29 and the outer wall part 30 of the slider 21 slides against the supporter 12a, the slider 21 moves along the supporter 12a. The pressing part 27 of the slider 21 which has moved downward presses the contact part 14a of the rubber cup 14, so that the deformation part 14d of the rubber cup 14 is deformed. Moreover, the plate part 28 of the slider 21 presses the pressing part 14b of the rubber cup 14 in accordance with the downward movement of the slider 21, and therefore the pressing part 14b of the rubber cup 14 contacts and presses the membrane sheet 13. Thereby, the lower electrode 61a and the upper electrode 61b provided in the membrane sheet 13 are electrically connected.

When the user releases a finger from the key top 4, the rubber cup 14 returns to the original shape. Therefore, the key top 4 and the rubber cup 14 return to original positions by the elasticity of the rubber cup 14. Thereby, the membrane sheet 13 is not pressed by the pressing part 14b, and hence the upper electrode 61b of the contact 60 is disconnected from the lower electrode 61a. Thus, the key switch device of the present embodiment can connect or open the upper electrode 61b and the lower electrode 61a formed in the membrane sheet 13.

Figure 3:
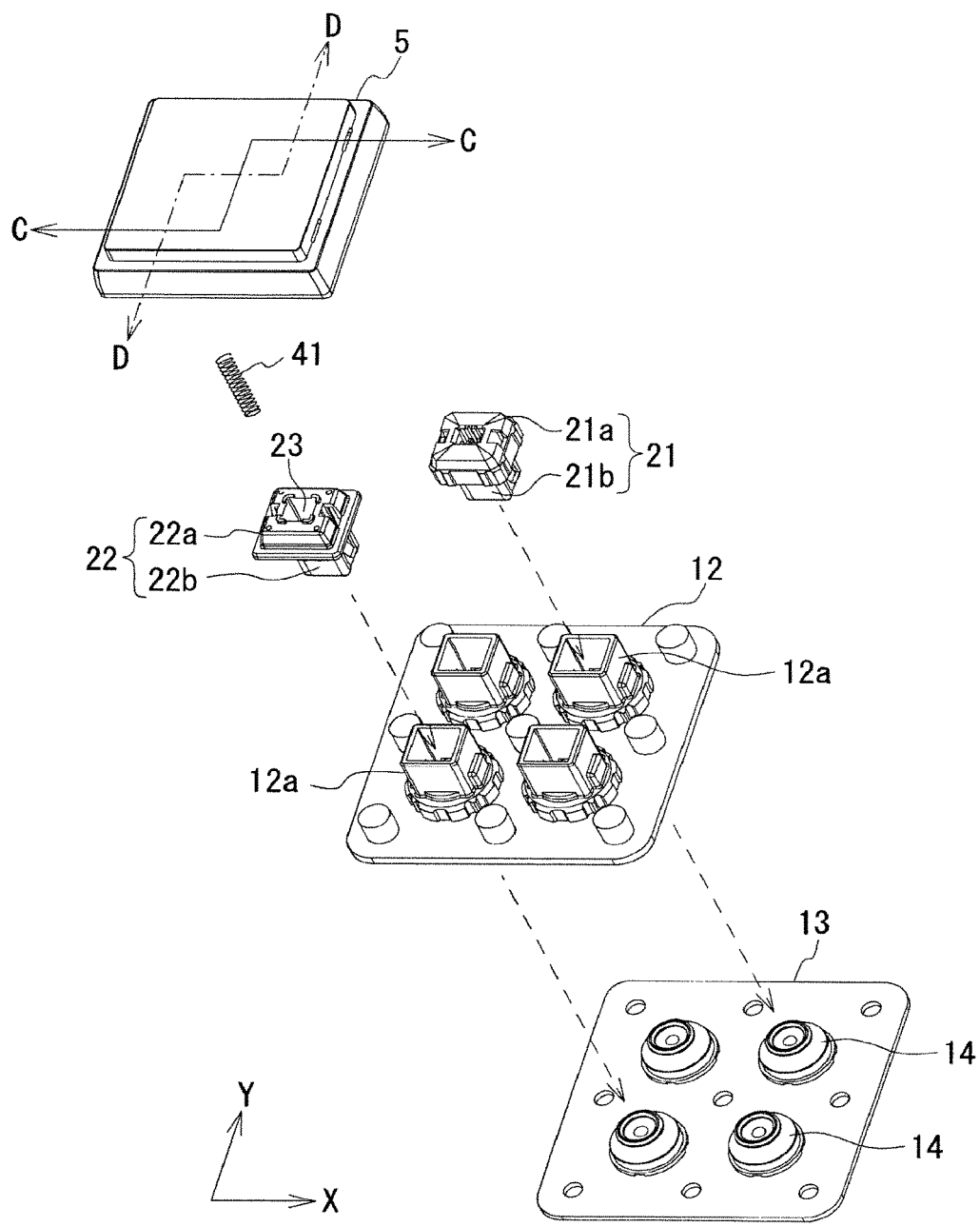
FIG. 3 is an exploded perspective view of the keyboard on which a quadruple-size key top is arranged.
Figure 4:
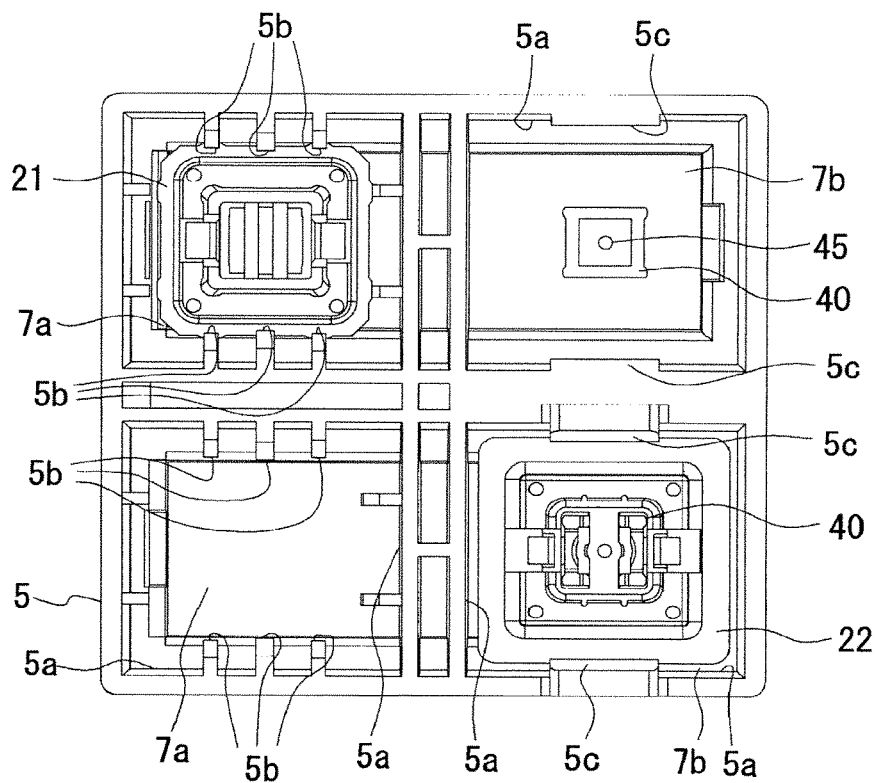
FIG. 4 is a diagram illustrating a back surface of the key top to which a slider and a non-slider are attached.
Figure 5:
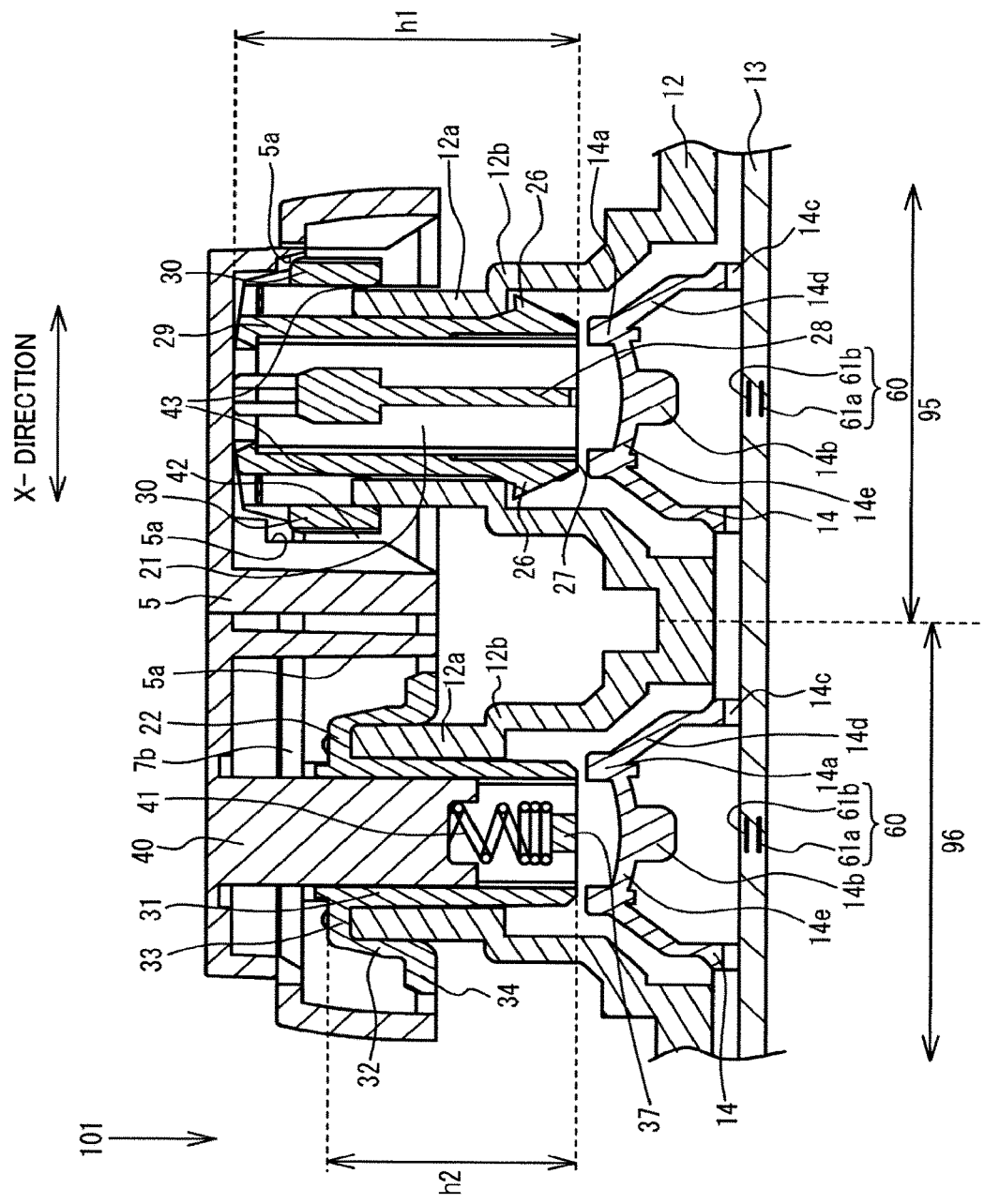
FIG. 5 is a cross-section diagram taken along line C-C of FIG. 3 when the keyboard is assembled.
Figure 6:
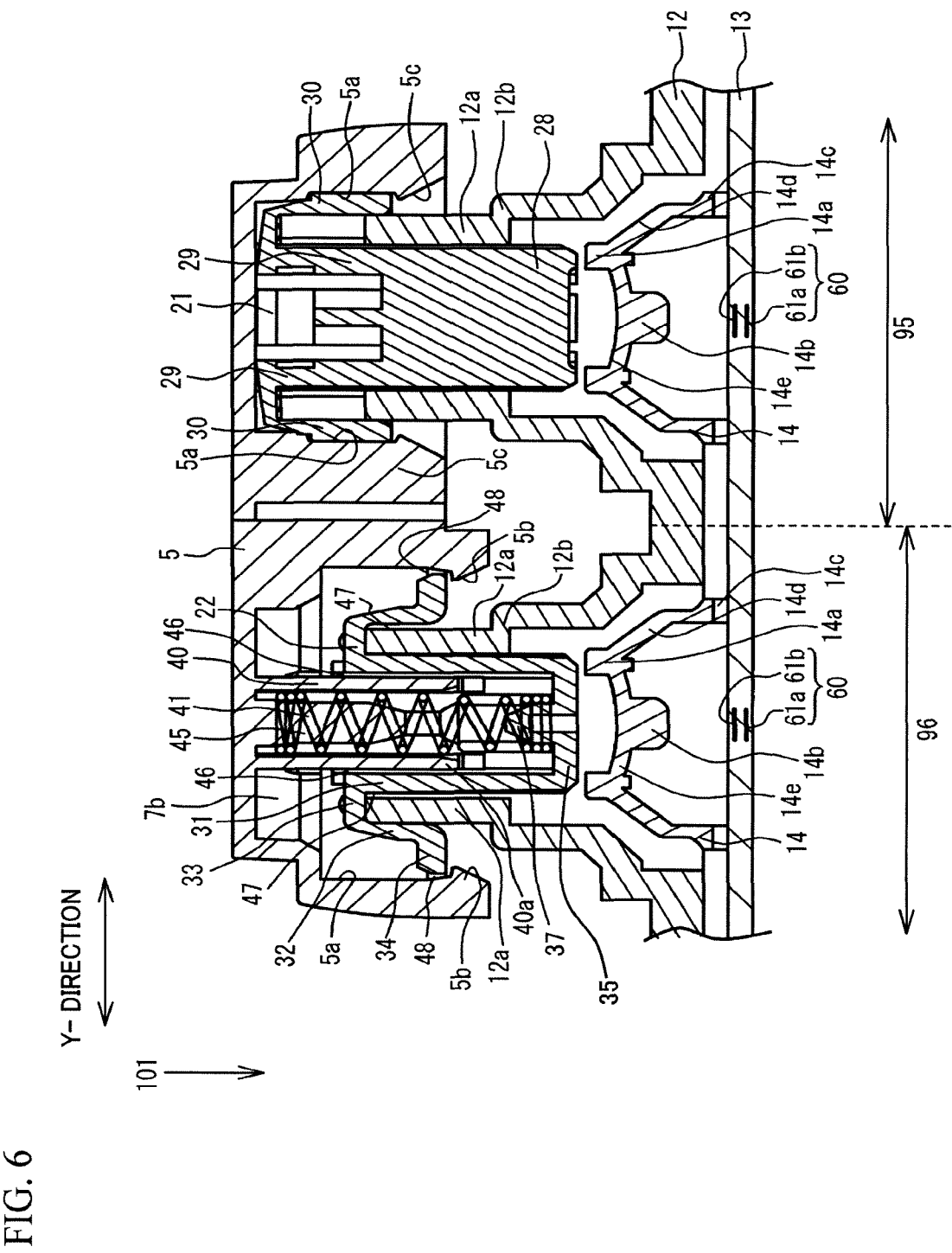
FIG. 6 is a cross-section diagram taken along line D-D of FIG. 3 when the keyboard is assembled.

FIG. 3 is an exploded perspective view of the keyboard 2 on which the quadruple-size key top 5 is arranged. FIG. 4 is a diagram illustrating a back surface of the key top 5 to which the slider 21 and a non-slider 22 are attached. FIG. 5 is a cross-section diagram taken along line C-C of FIG. 3 when the keyboard 2 is assembled. FIG. 6 is a cross-section diagram taken along line D-D of FIG. 3 when the keyboard 2 is assembled.

As illustrated in FIG. 3, the keyboard 2 includes the quadruple-size key top 5, a spring 41, the slider 21, the non-slider 22 as an example of a non-slider, the substrate 12, the membrane sheet 13, and the rubber cup 14. The non-slider 22 includes a hole 23 in the center thereof, and the spring 41 is inserted into the hole 23. The spring 41 is arranged between a bottom surface of the non-slider 22 and the key top 5. The slider 21 is higher than the non-slider 22 (see a height h1 of the slider 21 and a height h2 of the non-slider 22 in FIG. 5). The slider 21 and the non-slider 22 include head parts 21a and 22a and body parts 21b and 22b, respectively. The head parts 21a and 22a are attached to the back surface of the key top 5, and the body parts 21b and 22b are inserted into two supporters 12a arranged diagonally, respectively.

The substrate 12 includes four tubular supporters 12a. Four rubber cups 14 are arranged between the four supporters 12a and the four contacts 60 (not shown in FIG. 3) formed in the membrane sheet 13. Here, in the present embodiment, the structures of the plurality of supporters 12a are the same as each other. Therefore, when the key top is replaced with another key top, the slider 21 and/or the non-slider 22 can be removed or attached from/to the supporter 12a at a desired position, and therefore it is easy to change the size of the key top and change the key layout.

When the key top 5 is depressed, the non-slider 22 does not depress the rubber cup 14 arranged directly below and the spring 41 shrinks. On the other hand, the slider 21 depresses the rubber cup 14 arranged directly below. When the finger is released from the key top 5, the spring 41 extends and pushes up the key top 5, and the rubber cup 14 arranged directly below the slider 21 further pushes up the key top 5 via the slider 21 by returning to the original shape.

As illustrated in FIG. 4, recess parts 7a for arranging two sliders 21 and recess parts 7b for arranging two non-sliders 22 are formed on the back side of the quadruple-size key top 5. Each of the recess parts 7a and 7b is surrounded by four wall parts 5a. Claw parts 5b for fixing the slider 21 are provided on the recess part 7a. On the other hand, claw parts 5c for fixing the non-slider 22 are provided on the recess part 7b. A tubular projection part 40 and a rod-like part 45 are formed in the center of the recess part 7b to arrange the non-slider 22. The tubular projection part 40 and the rod-like part 45 extend vertically upward against the sheet of FIG. 4. The rod-like part 45 is arranged in the center of the tubular projection part 40. The spring 41 is arranged between the tubular projection part 40 and the rod-like part 45.

As illustrated in FIGS. 5 and 6, in the keyboard 2, the slider 21 and the non-slider 22 are attached to two unit parts. The key top 5 is attached to the top of the slider 21 and the non-slider 22. The key top 5, the slider 21 and the non-slider 22 can be integrally attached to or integrally removed from the unit parts.

When the key top 5 is depressed, the plurality of unit parts which engage with the slider 21 and the non-slider 22 are separated into a unit part in which the lower electrode 61a and the upper electrode 61b are connected to each other and a unit part in which an open condition is maintained without connecting the lower electrode 61a and the upper electrode 61b. In the present embodiment, the unit part in which the lower electrode 61a and the upper electrode 61b are connected to each other is referred to as a connection unit part, and the unit part in which the open condition of the lower electrode 61a and the upper electrode 61b is maintained is referred to as a non-connection unit part. A domain illustrated by an arrow 95 is a domain where the connection unit part is arranged, and a domain illustrated by an arrow 96 is a domain where the non-connection unit part is arranged.

The structure of the key switch device arranged on the domain illustrated by the arrow 95 of FIG. 6 is the same as that of key switch device including the single-size key top 4 illustrated in FIG. 2B. In FIG. 6, the slider 21 engages with the connection unit part. In FIG. 6, the outer wall part 30 is in close contact with the wall parts 5a of the key top 5, and there is no gap as a play space between the outer wall part 30 and the wall parts 5a of the key top 5. There are also no gaps as the play spaces between the inner wall part 29 and the supporter 12a and between the outer wall part 30 and the supporter 12a. Therefore, the slider 21 can move up and down, but cannot in a Y-direction.

In the domain illustrated by the arrow 95 of FIG. 5, a gap 42 as the play space is provided between the outer wall part 30 of the slider 21 and the wall parts 5a of the key top 5, and a gap 43 as the play space is provided between the supporter 12a, and the inner wall part 29 and the outer wall part 30 of the slider 21. Each width of the gaps 42 and 43 is about 0.5 mm, for example. Thus, the gaps 42 and 43 are provided in an X-direction, so that the slider 21 can move in the X-direction. As a result, the slider 21 can move up and down and can move in the X-direction, but cannot move in the Y-direction. That is to say, the slider 21 is restrained in the Y-direction, and has rattle or play in the X-direction. The other structure of the key switch device arranged on the domain illustrated by the arrow 95 of FIG. 0.5 is the same as that of key switch device including the key top 4 illustrated in FIG. 2A.

In the domain illustrated by the arrow 96 of FIGS. 5 and 6, the non-slider 22 engages with the non-connection unit part. As illustrated in FIG. 5, the height h2 of the non-slider 22 is lower than the height h1 of the slider 21. In the domain illustrated by the arrow 96 of FIG. 6, the projection part 40 and the rod-like part 45 extend downward from the back side of the key top 5.

In the domain illustrated by the arrow 96 of FIG. 6, the non-slider 22 includes: an inner wall part 31 opposite to the supporter 12a; an outer wall part 32 opposite to the supporter 12a; a coupling part 33 that couples the tops of the inner wall part 31 and the outer wall part 32 with each other; a flange part 34 that horizontally extends from a lower end of the outer wall part 32; a bottom part 35; and a projection 37 extending upward from the bottom part 35. The inner wall part 31 is inserted into the inside of the supporter 12a. The supporter 12a is nipped between the inner wall part 31 and the outer wall part 32, and the top of the supporter 12a contacts the coupling part 33. The non-slider 22 does not slide up and down against the supporter 12a unlike the slider 21. Therefore, the non-slider 22 does not contact the rubber cup 14, and in the contact 60 in the inside of the membrane sheet 13, the open condition is maintained.

The projection part 40 and the rod-like part 45 are inserted into the inner wall part 31. The rod-like part 45 is opposite to the projection 37. The spring 41 is arranged so as to wind the outer periphery of the rod-like part 45 and the projection 37. Moreover, the spring 41 is arranged between the non-slider 22 and the back side of the key top 5 and between the projection part 40 and the rod-like part 45.

In the domain illustrated by the arrow 96 of FIGS. 5 and 6, a space of the recess part 7b exists in the back side of the key top 5, and therefore the key top 5 slides up and down against the non-slider 22 and the supporter 12a. When the key top 5 is depressed, the key top 5 shrinks the spring 41. When the key top 5 is completely depressed, a lower part 40a of the projection part 40 contacts the bottom part 35, and the coupling part 33 contacts the back side of the key top 5. When the finger is released from the key top 5, the spring 41 extends and pushes up the key top 5.

Here, in the domain illustrated by the arrow 96 of FIG. 5, the projection part 40 slidably and closely contacts the inner wall part 31, and there is no gap as the play space between the projection part 40 and the inner wall part 31. There are also no gaps as the play spaces between the inner wall part 31 and the supporter 12a and between the outer wall part 32 and the supporter 12a. Therefore, the non-slider 22 can move up and down, but cannot in the X-direction.

In the domain illustrated by the arrow 96 of FIG. 6, a gap 46 as the play space is provided between the inner wall part 31 of the non-slider 22 and the projection part 40 of the key top 5, and a gap 47 as the play space is provided between the supporter 12a, and the inner wall part 31 and the outer wall part 32 of the non-slider 22. Moreover, a gap 48 as the play space is provided between the flange part 34 of the non-slider 22 and the wall parts 5a of the key top 5. Each width of the gaps 46 to 48 is about 0.5 mm, for example. Thus, the gaps 46 to 48 are provided in the Y-direction, so that the non-slider 22 can move in the Y-direction. As a result, the non-slider 22 cannot move up and down and move in the X-direction, but can move in the Y-direction. That is to say, the non-slider 22 is restrained in the X-direction, and has the rattle in the Y-direction.

Here, when both of the slider 21 and the non-slider 22 are restrained in the X-direction and the Y-direction, if the positions of the recess parts 7a and 7b, the projection part 40 and the supporters 12a of the substrate 12 are shifted slightly from desired positions by a manufacturing error, there is a problem that the slider 21 and the non-slider 22 attached to the key top 5 cannot be inserted into the supporters 12a.

Figure 7A:
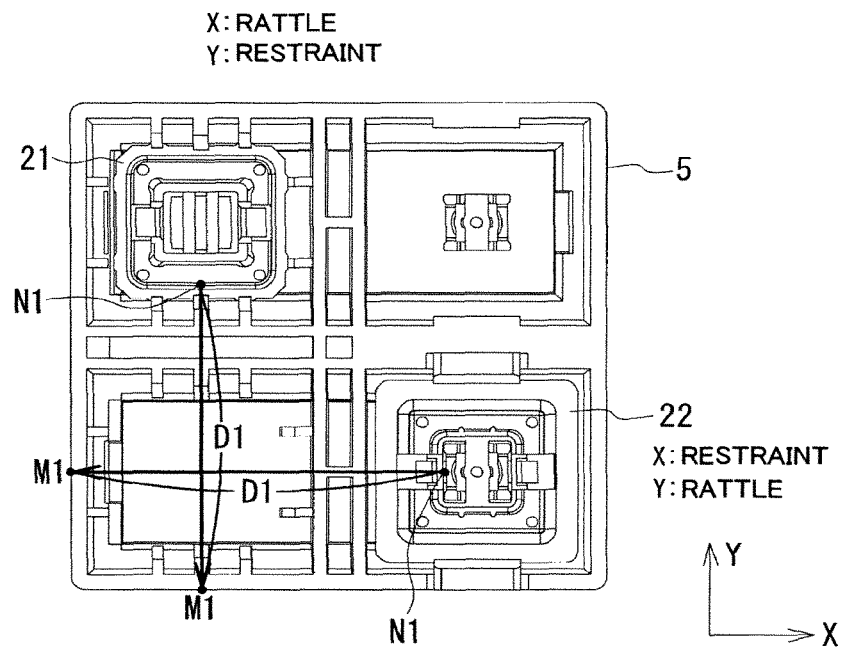
FIG. 7A is a diagram illustrating restraint and rattle between the key top, and the slider and the non-slider according to an embodiment.
Figure 7B:
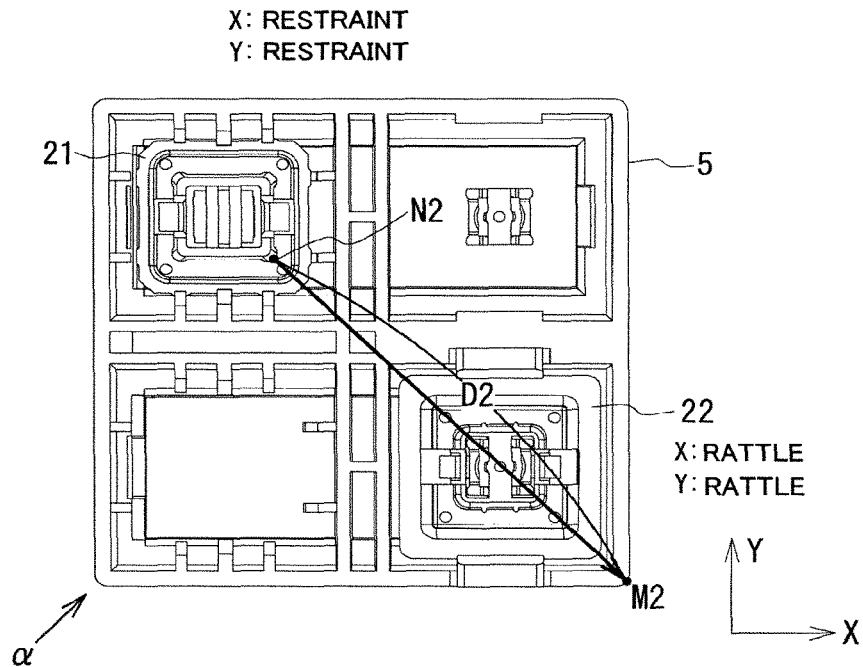
FIG. 7B is a diagram illustrating the restraint and the rattle between the key top, and the slider and the non-slider according to a comparative example.
Figure 8A:
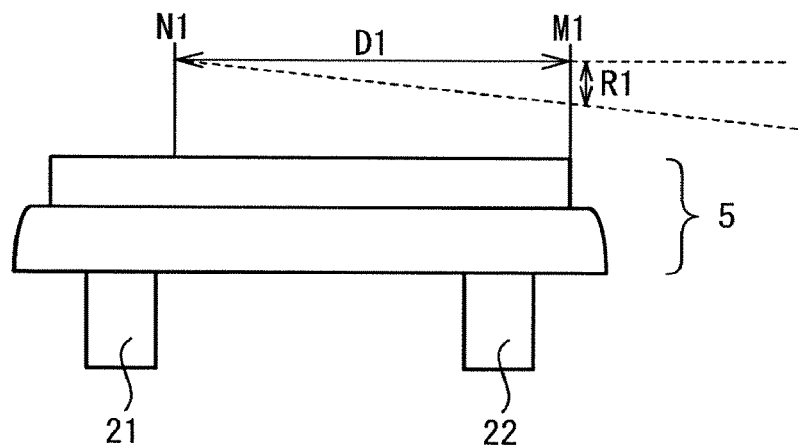
FIG. 8A is a side view of the key top to which the slider and the non-slider of FIG. 7A are attached, as viewed from an X-direction.
Figure 8B:
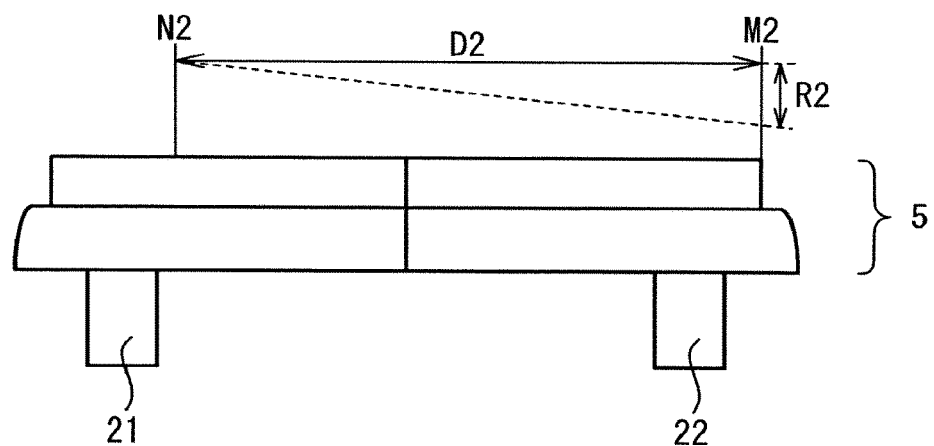
FIG. 8B is a side view of the key top to which the slider and the non-slider of FIG. 7B are attached, as viewed from an α-direction.

FIG. 7A is a diagram illustrating restraint and rattle between the key top 5, and the slider 21 and the non-slider 22 according to the present embodiment. FIG. 7B is a diagram illustrating the restraint and the rattle between the key top 5, and the slider 21 and the non-slider 22 according to a comparative example. FIGS. 7A and 7B illustrate the back side of the key top 5 to which the slider 21 and the non-slider 22 are attached. FIG. 8A is a side view of the key top 5 to which the slider 21 and the non-slider 22 of FIG. 7A are attached, as viewed from the X-direction. FIG. 8B is a side view of the key top 5 to which the slider 21 and the non-slider 22 of FIG. 7B are attached, as viewed from an α-direction.

As with FIGS. 5 and 6, in FIG. 7, the slider 21 is restrained in the Y-direction, and has the rattle in the X-direction. The non-slider 22 is restrained in the X-direction, and has the rattle in the Y-direction. It is assumed that, in FIG. 7B, the slider 21 is restrained in the X-direction and the Y-direction, and the non-slider 22 has the rattle in the X-direction and the Y-direction.

Here, when a maximum distance from a restraint point of the slider 21 and the non-slider 22 to a depression point which is less susceptible to the restraint is taken into consideration, the maximum distance is a distance D1 from a restraint point N1 to a depression point M1 in FIG. 7A. In FIG. 7B, the maximum distance is a distance D2 from a restraint point N2 to a depression point M2. The distance D2 is longer than the distance D1. The rattle in a vertical direction of the key top 5 at the depression point M1 becomes a rattle R1, as illustrated in FIG. 8A. The rattle in the vertical direction of the key top 5 at the depression point M2 becomes a rattle R2 larger than a rattle R1, as illustrated in FIG. 8B.

In the present embodiment, the slider 21 and the non-slider 22 are arranged diagonally, the slider 21 is restrained in the Y-direction, and the non-slider 22 is restrained in the X-direction. Therefore, compared with a case where any one of the slider 21 and the non-slider 22 is restrained in the X-direction and the Y-direction and the other has the rattle in the X-direction and the Y-direction, it is possible to shorten the maximum distance from the restraint point to the depression point which is less susceptible to the restraint, and to reduce the rattle in the vertical direction of the key top 5 at the depression point. As a result, when a corner (e.g. the depression point M2) of the key top 5 is depressed, it is possible to prevent a condition where the contact 60 is not on (i.e., a condition where the key input is not performed).

In the present embodiment, the slider 21 is restrained in the Y-direction and the non-slider 22 is restrained in the X-direction. However, the slider 21 may be restrained in the X-direction and the non-slider 22 may be restrained in the Y-direction.

Moreover, in the present embodiment, the slider 21 and the non-slider 22 are attached to the two unit parts arranged diagonally among the four unit parts, and there is no need to attach the slider 21 and the non-slider 22 to the remaining two unit parts, therefore the number of components to be attached to the unit part can be reduced.

In the present embodiment, the description is given of the four supporters 12a arranged in 2 columns and 2 rows, and the quadruple-size key top 5. However, the slider 21 and the non-slider 22 may be attached to the two supporters 12a arranged at diagonal corners (e.g. an upper right corner and a lower left corner, or an upper left corner and a lower right corner) among K*L supporters 12a arranged in K columns and L rows (K, L: an integer of two or more), respectively, and a K*L-size key top (i.e., a key top having an area corresponding to the K*L supporters 12a) may be attached to the slider 21 and the non-slider 22. With the configuration, it is possible to shorten the maximum distance from the restraint point to the depression point which is less susceptible to the restraint, and to reduce the rattle in the vertical direction of the key top 5 at the depression point.

In the present embodiment, the key top 5 is supported by the plurality of supporters 12a via the slider 21 and the non-slider 22, presses the rubber cup 14 of the connection unit part, and connects the upper electrode 61b to the lower electrode 61a. Moreover, the non-slider 22 does not slide up and down and does not put pressure on the rubber cup 14. By adopting this configuration, an operation load of the key top 5 (i.e., an operation load in the case of providing the single slider and the single non-slider for the plurality of unit parts) can be almost the same as an operation load of the key top 4 (i.e., an operation load in the case of providing the single slider for the single unit part). Therefore, it is possible to suppress the increase in the operation load by enlarging the size of the key top.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A keyboard to which key tops having different sizes are attachable, the key board comprising:
   a slide member that is attached to one of the key tops, slides in accordance with an operation of the one of the key tops, and presses a contact via an elastic member; and
   supporters, each allowing the slide member to be inserted therein,
   wherein, when a key top having a size corresponding to a total size of first of the supporters, which are arranged in K columns and L rows, wherein each of K and L is an integer of two or more, is attached to the keyboard, the slide member is inserted in one of the first of the supporters, and a non-slide member is inserted in another of the first of the supporters that is located diagonally to the one of the first of the supporters in which the slide member is inserted, the non-slide member being attached to the key top and never sliding in accordance with the operation of the key top.

2. The keyboard according to claim 1, wherein
   the slide member is restrained from moving in a first direction and is movable in a second direction perpendicular to the first direction with respect to the key top, and
   the non-slide member is restrained from moving in the second direction and is movable in the first direction with respect to the key top.

3. The keyboard according to claim 1, wherein
   the supporters have an identical shape.

4. A key switch comprising:
   a single key top;
   supporters arranged in K columns and L rows, wherein each of K and L is an integer of two or more, contacts, each being located under a corresponding one of the supporters;

a slide member that is inserted in one of the supporters, is attached to the single key top, slides in accordance with an operation of the single key top, and presses the corresponding contact; and a non-slide member that is inserted in another of the supporters, which is located diagonally to the one of the supporters in which the slide member is inserted, and never slides in accordance with the operation of the single key top.

5. The key switch according to claim 4, wherein the slide member is restrained from moving in a first direction and is movable in a second direction perpendicular to the first direction with respect to the single key top, and the non-slide member is restrained from moving in the second direction and is movable in the first direction with respect to the single key top.

6. The key switch according to claim 4, further comprising:

a spring arranged between the single key top and the non-slide member.

7. The key switch according to claim 4, wherein the supporters have an identical shape.

* * * * *

UNITED STATES PATENT AND TRADEMARK OFFICE
CERTIFICATE OF CORRECTION

PATENT NO. : 10,134,541 B2
APPLICATION NO. : 15/619854
DATED : November 20, 2018
INVENTOR(S) : Daisuke Taga It is certified that error appears in the above-identified patent and that said Letters Patent is hereby corrected as shown below:

On the Title Page

Item [73] (Assignee), Line 1:
Delete "COMPONENET" and insert -- COMPONENT --, therefor.

Signed and Sealed this
Twenty-second Day of January, 2019

Andrei Iancu
*Director of the United States Patent and Trademark Office*